Aug. 14, 1945.   H. J. LANDAY ET AL   2,382,885
GAUGING APPARATUS
Filed April 23, 1943   3 Sheets-Sheet 1
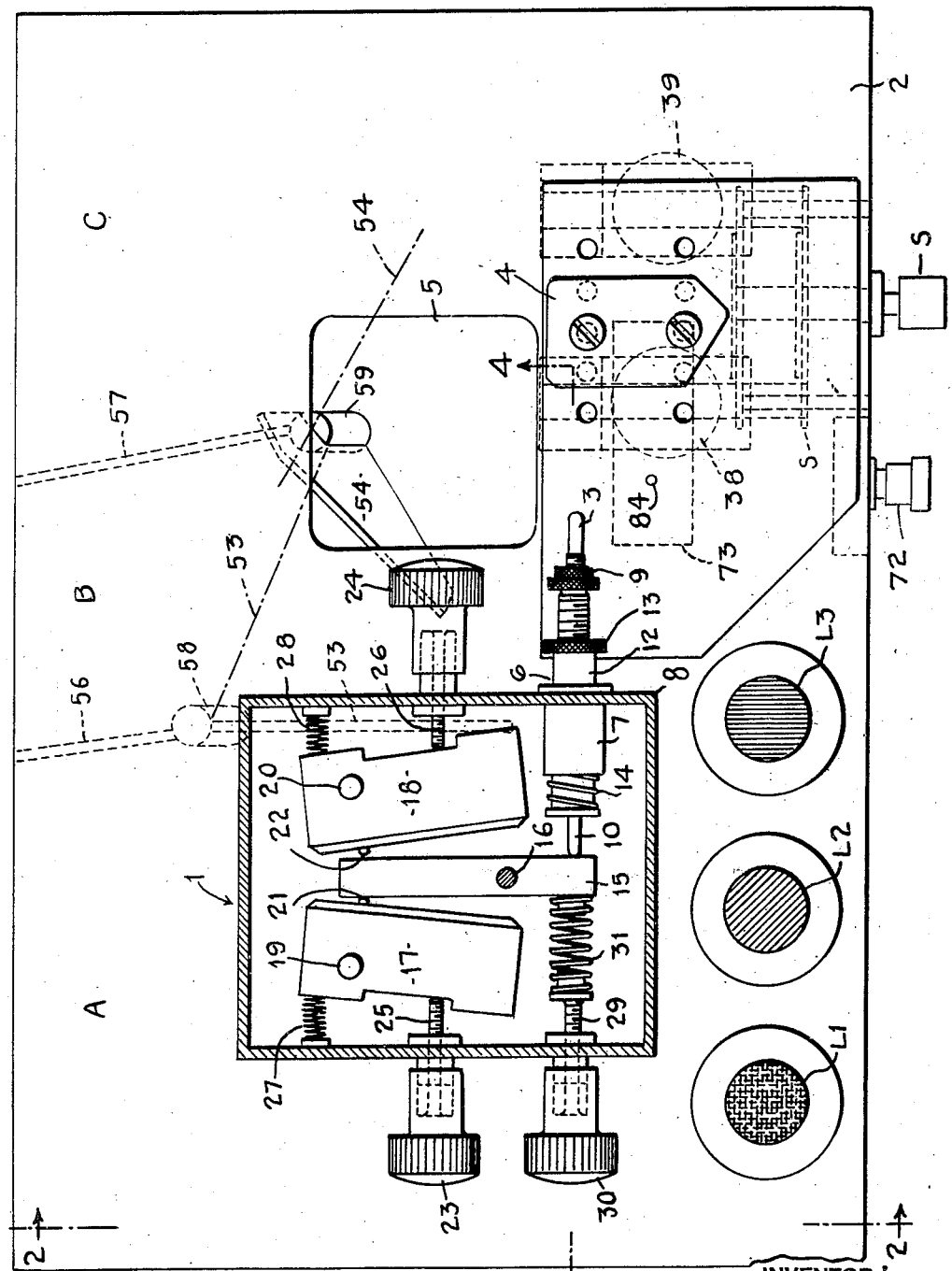

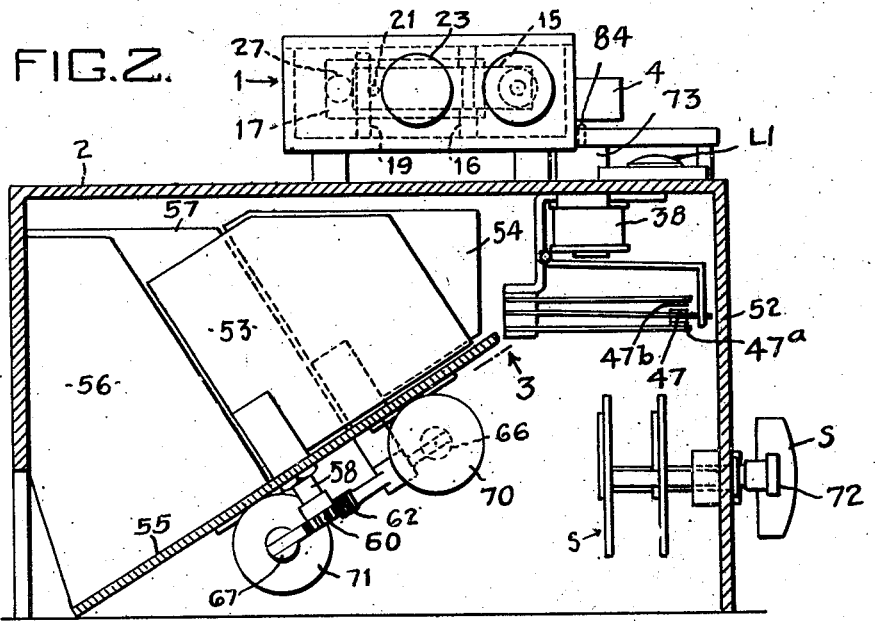
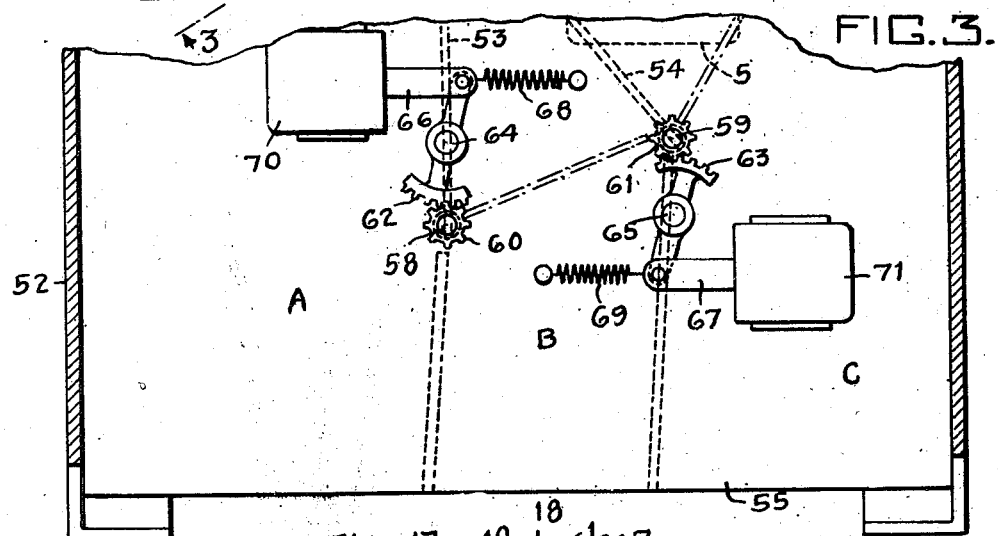
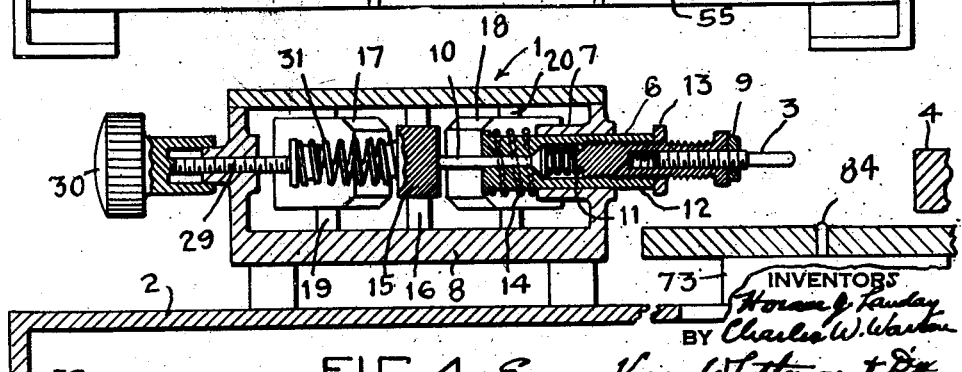

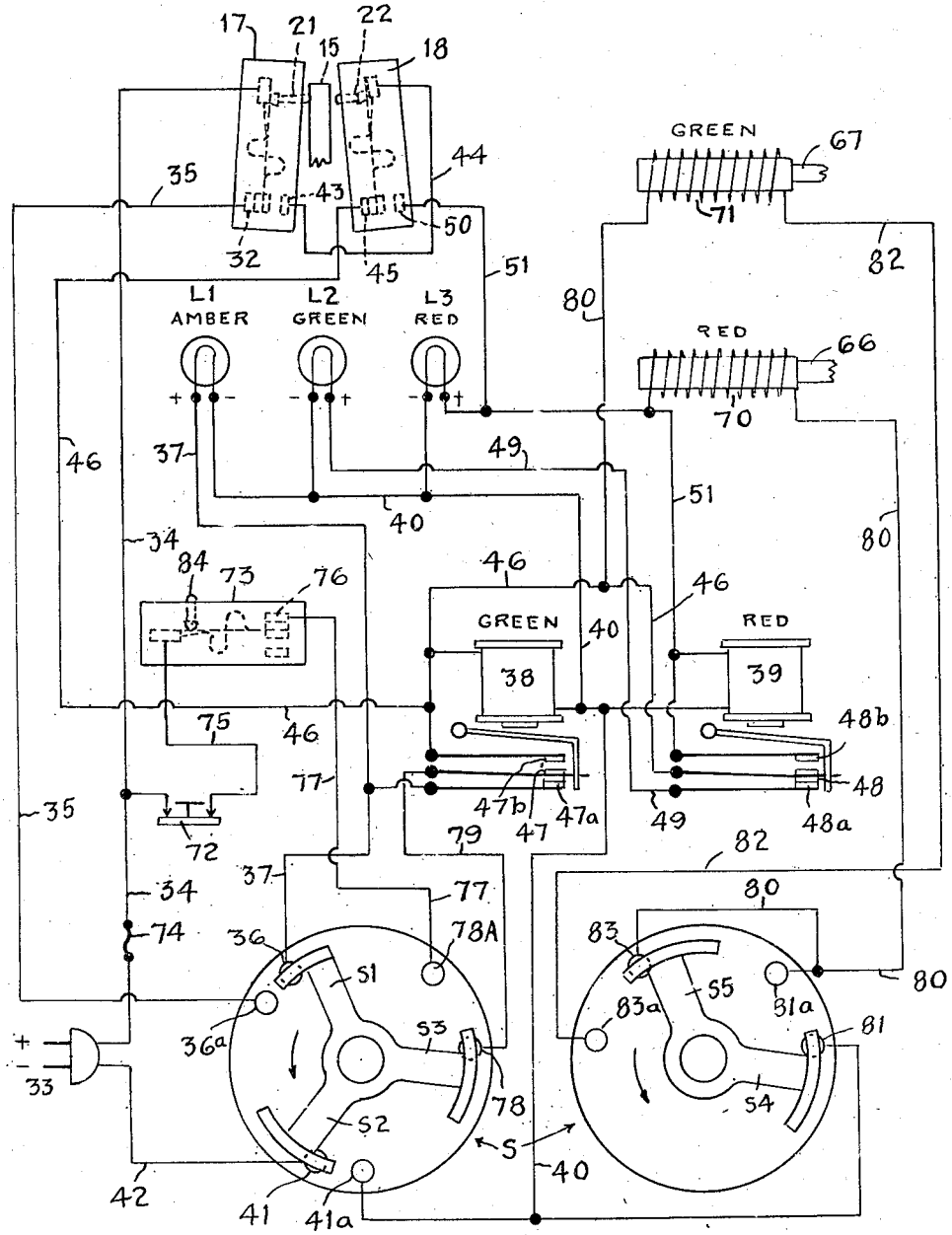

Patented Aug. 14, 1945

2,382,885

UNITED STATES PATENT OFFICE 2,382,885

GAUGING APPARATUS

Horace J. Landay, Woodmere, N. Y., and Charles W. Warren, North Plainfield, N. J.

Application April 23, 1943, Serial No. 484,288

3 Claims. (Cl. 209—88)

The present invention relates to apparatus for gauging articles which may be produced in large quantities with one or more dimensions lying within predetermined measurements of small permissible variation.

The principal object of the invention is to provide a gauging apparatus which may be adjusted readily to gauge a selected group of supposedly identical articles, to indicate those which are within permissible predetermined variation, those which are oversize and those which are undersize. A further object of the invention is to provide semi-automatic means for classifying gauged articles, and to that end the apparatus of the invention preferably includes gauge controlled mechanisms by which the gauged articles are classified, for example, into the three categories above mentioned. Other objects and advantages of the invention will be apparent from the following description.

A preferred embodiment of the invention has been selected for purposes of description and illustration and is shown in the accompanying drawings wherein:

Figure 1 is a top plan view of apparatus embodying the invention;

Figure 2 is a cross section on the line 2—2 of Figure 1;

Figure 3 is a plan view of the under side of part of the apparatus on the diagonal line 3—3 of Figure 2;

Figure 4 is a longitudinal vertical section on the line 4—4 of Figure 1; and

Figure 5 is a wiring diagram showing the electrical connections of the several units of the apparatus, which connections are entirely omitted from the other figures of the drawings for the sake of simplicity.

Referring to Figure 1, a gauging head, generally designated by the numeral 1, is mounted on a platform 2. This gauging head carries an axially adjustable and movable spindle 3 mounted in such relation with respect to an abutment or anvil 4 that articles to be gauged may be passed between the spindle 3 and the abutment 4 in order to gauge a selected dimension of the article. When the gauged article has been passed between the spindle and abutment and gauged in the manner hereinafter to be described, it may be dropped through an opening 5 in the platform 2, whereupon it may be automatically directed, in a manner also hereinafter described, into one or another of three compartments indicated generally by the letters A, B and C.

Inasmuch as the gauging head itself embodies improvements in apparatus of this type and may be used independently of the classifying mechanism which directs gauged articles into one or another of the three compartments just mentioned, the gauging head will first be described in detail in conjunction with so much of the apparatus and electrical connections as is necessary to give a visual indication of the action of the gauging head.

Referring now to Figures 1 and 4, it may be seen that the work contacting spindle tip 3 is a part of a spindle assembly 6 which is mounted for axial movement in bushing 7, the latter being mounted in a suitable housing or encasement 8. The spindle assembly 6 comprises the threaded adjustable tip 3 locked in position by nut 9, an overtravel plunger 10 urged outwardly by an overtravel spring 11, threaded adjusting sleeve 12 locked in position by nut 13, and main spindle spring 14. As shown in Figure 1 the spring 14 will tend to move the spindle assembly 6 along its axis toward a lever arm 15 which is pivoted at 16 in the housing 8. Thus a constant contact is maintained between overtravel plunger 10 and lever arm 15.

Also mounted in housing 8 are two switch boxes 17 and 18, so pivoted on suitable pivots 19 and 20 that the switch actuating plungers 21 and 22 are contacted and depressed or released by the motion of pivot arm 15. Any motion of spindle assembly 6 along its axis will be transmitted to lever arm 15 and magnified in amplitude by an amount dependent upon the ratio of the distances between the contact point of overtravel plunger 10 and the contact points of switch actuating plungers 21 and 22 to the lever arm pivot point 16. Preferably this ratio is between 3 and 4 to 1 in order that motion of the spindle assembly 6 will be correspondingly amplified. The relative total separation of actuating plungers 21 and 22, as well as the individual resting position of each plunger in relation to the pivot arm 15, is adjustable by rotation of knobs 23 and 24 which drive threaded screws 25 and 26 through suitable bushings in the housing 8. Bearing on the switch boxes 17 and 18 on the sides of switch pivotal mountings 19 and 20 opposite from screws 25 and 26, are compression springs 27 and 28 which maintain the position of switch boxes 17 and 18, always in firm contact with screws 25 and 26. Thus by adjusting knobs 23 and 24, the position of the actuating plungers 21 and 22 may be varied in relation to pivot arm 15.

Also mounted in housing 8 is a threaded adjusting screw 29 which may be rotated by knob 30 to control the pressure exerted by a compression spring 31 bearing against pivot arm 15 in opposition to the overtravel plunger tip 10. By adjustment of the knob 30 the spring 31 is tensioned to overbalance spring 14 by an amount great enough to cause lever arm 15 to depress the operating plunger 21 of switch 17 to its depressed or left hand position as shown in Figure 1.

The switch boxes 17 and 18 contain one-pole two position switch mechanisms which may be operated by very slight motion of the plungers 21 and 22, as for example the mechanism shown in United States Patent No. 1,960,020, dated May 22, 1934, and particularly Figure 1 of said patent. The electrical circuits controlled by these switches will be later described.

In order to adjust the gauge head 1 to properly gauge production pieces, it is necessary to use two standard master pieces which correspond in dimension to the maximum and minimum acceptable dimensions. The difference in size of these pieces will therefore be the tolerance or permissible variation allowed.

With the minimum master piece in place between the anvil 4 and the work contacting tip 3, a rough adjustment is made by loosening the lock nut 9 and rotating the threaded tip 3 until contact is made with master piece, whereupon the lock nut 9 is tightened. The overtravel adjusting sleeve 12 held by lock nut 13 has been previously adjusted to provide a proper tension of overtravel compression spring 11 against overtravel plunger 10.

The knob 23 may now be rotated in the proper direction to obtain a position of switch 17 such that operating plunger 21 just moves from the depressed or left position to the undepressed or right position as viewed in Figure 1. The minimum standard work piece may now be removed from between the tip 3 and anvil 4, thus permitting the lever 15 to move counterclockwise under the influence of spring 31 to depress and maintain operating plunger 21 of switch 17 in depressed condition. This adjustment will represent the minimum working pressure of the spindle tip 3 on the work, but can be increased to any desired pressure above the minimum by further rotation of knob 30. The knob 24 may now be turned to rotate switch box 18 as far as it will go in counterclockwise direction. The standard maximum work piece may now be inserted in gauging position between pin 3 and anvil 4. By turning the knob 24 the switch box 18 is rotated in clockwise direction until the operating plunger 22 moves from its normal or undepressed left position to its depressed or right position.

In connection with the adjustment of switch boxes 17 and 18, it may be stated that for any comparing instrument of this nature it is desirable that adjustment of the tolerance settings be as rapid as possible and yet capable of an accuracy consistent with the tolerances of the work being gauged. In practice, this means that where the work to be gauged has liberal tolerances, it is desirable that adjustments be rapidly made as by a few turns of the adjusting knobs. Where extremely small tolerances are encountered, it is desirable that fine adjustments can be made. This is facilitated by an arrangement which requires many turns of adjusting knobs to accomplish only small changes in the tolerance settings of the instrument.

Such an adjustment is possible with the present invention and will be explained by reference to switch 18 and its associated mechanisms. The same conditions will be seen to exist with respect to switch 17. It will be observed that as the switch case 18 is rotated upon its pivot 20 the plunger 22 will move upon the circumference of a circle whose center corresponds with that of pivot 20. When the switch case is parallel to the lever arm 15 the plunger 22 will be displaced slightly from a line drawn through the pivot of the switch box at right angles to the lever 15. Any given angular displacement of the switch box as by rotation of the knob 24, will move the plunger 22 away from contact with lever 15 to a lesser extent in the described position than it will when the switch box and lever are not parallel. In other words, the motion of the plunger 22 toward and away from the lever 15 will approximate that of simple harmonic motion as the switch box is rotated, thus providing a small change in position for each turn of the adjusting knob 24 when the switch box 18 and lever 15 are approximately parallel, and increasingly greater changes in position for each turn of the knob as the switch box and lever are moved further away from parallelism. By this arrangement a very fine adjustment may be effected when necessary.

The electrical connections for the apparatus thus far described will be apparent from the wiring diagram shown in Figure 5. Therein a five circuit three position switch S controls the entire instrument, the five contact arms being designated S1 to S5 inclusive. It will be understood that the diagram represents two plates of the same switch mounted upon a common axis. In the first position, as shown, none of the circuits are energized. The second position brings into operation only the indicating mechanism heretofore described while the third position actuates the indicating mechanism and classifying mechanism later to be described.

The functioning of the instrument will now be described for the second position of the main switch S. With no work in the gauging position, the spindle assembly 6 and pivot arm 15 are in such position that the actuating plunger 21 of switch 17 is in its left or depressed position closing contact 32. This resting position is maintained by adjustment of spring tension knob 30 and spring 31 as previously described. For the purpose of clarity only the current source, relays, solenoids and other parts about to be described have been given positive and negative designations. However it will be understood that with suitable electrical units, alternating or direct current may be used as desired. The positive circuit from a battery or other suitable source 33 will be transmitted through conductor 34 to contact 32 of switch 17; through conductor 35 to contacts 36 and 36a of switch section S1, through conductor 37 to positive side of amber lamp L1 and contact 41 of green relay 38. The negative side of amber lamp L1 as well as negative sides of green lamp L2, red lamp L3, green relay 38, and red relay 39, are all completed through conductor 40 to contact 41 and 41a of switch S2, thence through conductor 42 to negative side of source 33. Thus the amber lamp L1 will be illuminated. This condition will be established in the resting position and will not be disturbed when an undersized work piece is inserted in the gauging position.

If a work piece of acceptable dimension in relation to the adjustments made with the master gauge piece as heretofore described, is inserted in the gauging position, the spindle assembly 6 will displace the pivot arm 15 to a position where the actuating plunger 21 of the switch 17 is allowed to return to its normal or right hand undepressed position. This will open the contact 32 of switch 17 and extinguish the amber lamp L1. The contact 43 will, however, be closed and the positive circuit of the source transferred from the conductor 34 to contact 43, through conductor 44 to contact 45, through conductor 46 to the positive side of green relay 38 and its open contact 47b, and to the closed contacts 48 and 48a of relay 39, thence through conductor 49 to green lamp L2. Thus the relay 38 is now energized, the amber lamp L1 is extinguished, and the green lamp L2 illuminated. The closure of relay 38 performs a function which will later be described. Upon removal of the work piece the switches and circuits will return to their original conditions.

If an oversize work piece is inserted in the gauging position, the spindle displacement as previously described will first extinguish the amber lamp L1, momentarily illuminate the green lamp L2, and then the pivot arm 15 will further displace the operating plunger 22 of switch 18 to its right or depressed condition. This will complete the positive circuit from source 33 as heretofore described, except that contact 45 of switch 18 will now be open and contact 50 closed. Thus the positive circuit is carried through conductor 51 to the red lamp L3 illuminating this lamp, and to the positive side of the red relay 39 and its contact 48b. The red relay 39 will now be operated and contacts 48 and 48a will open, extinguishing the green lamp L2.

It is apparent that upon inserting work pieces to be gauged between the spindle tip 3 and anvil 4, those that are below the acceptable standard dimension will not cause sufficient motion of the pivot arm 15 to extinguish the amber lamp L1. This action will then be interpreted by the operator to indicate a rejectable, undersized piece. Insertion of work pieces which are within the acceptable tolerance range will cause motion of the pivot arm 15 sufficient to extinguish the amber lamp L1 and illuminate the green lamp L2 but not enough to illuminate red lamp L3. This action will indicate that the work piece is acceptable. However, if the piece to be gauged is oversize, the motion of the pivot arm 15 will be great enough to extinguish the amber lamp L1, illuminate and extinguish the green lamp L2 and illuminate the red lamp L3. This will indicate a rejectable, oversize piece.

In the preferred embodiment of the present invention, the lamps L1, L2 and L3 are so mounted as to illuminate windows in main housing 52 later to be described, which are within full and easy vision of the operator. Since the apparatus functions with great rapidity and follows the motion of the spindle, with only the speed of operation of the relays and switches as limiting factors, it is apparent that the operator need hold the work to be gauged in position only for a length of time sufficient for his reflex actions to interpret the color of the glowing windows. Thus it is evident that pieces may be gauged with great speed.

The gauging head and its operation having thus been described, that part of the apparatus which may be and preferably is used in conjunction with the gauging head and controlled thereby for classifying gauged pieces according to their dimensions, will now be described.

Below the platform 2 are three compartments A, B and C above mentioned. Entrance to these compartments through the opening 5 in the platform 2 is controlled by gates 53 and 54. As shown in the drawings, particularly in Figures 1 and 3, these gates are normally so positioned as to permit access only to compartment C which is the compartment for undersize articles. When it is desired to utilize that part of the apparatus which is about to be described, the switch S is turned to its third position to energize the circuits controlling the gates 53 and 54. The several parts will remain in the position shown with compartment C only accessible to articles dropped through the opening 5 until the gauging spindle is moved so as to change the circuits and actuate one or both of the gates 53 and 54. The gate 54 will be actuated and swung into the position indicated by broken lines in Figures 1 and 3 when the gauging spindle is moved sufficiently to indicate an article of the correct size within the permitted tolerance and will be held in such position as hereinafter explained, thus permitting an article of the proper size to be directed into compartment B. If the gauging point is moved still further away from the abutment 4, thus indicating that the gauged article is oversize, the gate 53 will also be actuated, and thus the gauged article dropped through the opening 5 will be directed into compartment A.

Referring now to Figures 1, 2 and 3, the structure of the compartments, gates, and mechanism for operating them, will now be described.

A suitable housing 52 provides support for platform 2 carrying gauging head 1 and other parts of the classifying mechanism to be now described. A sub-panel 55 is mounted in housing 52 and extends approximately from the front top to rear bottom at an angle of approximately 45°. Vertically mounted on the upper side of panel 55 are partitions 56 and 57 approximately shaped in a trapezoidal manner to divide the space between platform 2 and panel 55 into three compartments designated A, B and C as heretofore indicated. The lower or rear of these compartments are open in order that gauged pieces may be discharged into separate boxes, chutes, bags or other containers corresponding to the classifications mentioned. Since the panel 55 which forms the floor of compartments A, B and C is on an angle of approximately 45° it is obvious that work pieces being deposited in the entry of any compartment will be discharged by gravity into its corresponding container.

The gates 53 and 54 which control entry are also approximately trapezoidal in shape in order to occupy the space between panel 55 and platform 2 and are in effect movable continuations of partitions 56 and 57, respectively. The gates 53 and 54 are mounted on shafts 58 and 59 which are carried in bushings on panel 55 and are disposed vertically thereto. Mounted on shafts 58 and 59 but on the underside of panel 55, are gears 60 and 61 which are driven by gear sectors 62 and 63 mounted rotatably on pivots 64 and 65. Attached to gear sectors 62 and 63 are solenoid plungers 66 and 67 and springs 68 and 69. When solenoids 70 and 71 are not energized, springs 68 and 69 maintain gear sectors 62 and 63 against stops which are not shown. When in this neutral or at-rest position gate 53 is so positioned that any work piece directed through opening 5 in platform 2 will be deposited in the entryway of compartment C for undersized articles. If the solenoid 71 is energized the plunger 67 will be attracted and gear sector 63 rotated on its pivot 65 and through gear 61 will rotate gate 54 on its axis to the position shown by the broken lines in Figure 3. Work pieces now dropped through opening 5 in platform 2 will be deposited in compartment B for correctly sized articles since with gate 54 in its new position, the entryway to compartment C is shut off and only compartment B is open. Further if the above action takes place and solenoid 70 is also energized, plunger 66 will be attracted and sector 62 rotated on its pivot 64 which will rotate gear 60. Gate 53 will now assume the position shown by the broken lines in Figure 3. Thus any work piece now deposited can only be directed into compartment A for oversized articles. Upon release of solenoids 70 and 71 springs 68 and 69 will exert sufficient pressure to return both gates to their original positions.

The main housing 52 also supports the switch S, switches 72 and 73 to be later described, and the aforementioned windows for the indicating lamps L1, L2 and L3 as well as other associated parts. Lamps L1, L2 and L3, relays 38 and 39, solenoids 70 and 71 and fuse 74 are all mounted on underside of sub-panel 55.

When it is desired to use the automatic classifying mechanism of the present invention, switch S is placed in the third position. The several circuits as heretofore outlined will function as previously described. The additions necessary to operate the gates 53 and 54 and classify the work into and through the three compartments A, B and C will now be described.

When no work is in the gauging position, the amber lamp L1 will be illuminated and the gates 53 and 54 will be in the position shown in Figures 1 and 3. A circuit difference now to be noted is that with switch S in its third position, the positive circuit from source 33 to amber lamp L1 is completed through conductor 34 to switch 72, through conductor 75 to switch 73, through contact 76 and conductor 77 to contacts 78 and 78a of switch section S3, through conductor 79 to contacts 47 and 47a of green relay 38 and finally through conductor 37 to amber lamp L1. This condition will not be disturbed by a work piece that is smaller than the acceptable standard. Thus, this piece when passed through the gauging position and dropped through the opening 5 will be directed into and discharged through compartment C.

When a work piece of acceptable dimension is placed in the gauging position, spindle assembly 6 will be displaced to the mid position exactly as previously described. Now the positive circuit of source 33 will be supplied through conductors 34, 44 and 46 as and before, green relay 38 will be energized, opening contacts 47 and 47a and closing contacts 47 and 47b. Thus the amber light L1 will be extinguished and the green lamp L2 will be illuminated through contacts 48 and 48a of red relay 39 and conductor 49. In addition, positive circuit from source 33 will also be supplied solenoid 71 through an extension of conductor 46. Negative circuit from source 33 will be supplied both solenoids 70 and 71 through conductor 80 and contacts 81 and 81a of switch section S4, and through conductor 82 and contacts 83 and 83a of switch section S5 respectively. Therefore, when the green lamp L2 is illuminated, the solenoid 71 will be energized and the gate 54 will be actuated.

When the instrument is being used for automatic classifying, pieces are inserted into and passed through the gauging point with great rapidity. The spindle, therefore, will only be advanced to and remain in the indicating position corresponding to the size of the work piece for a very short interval and will then drop back to the resting position as with no work. Meanwhile the gate 54 has been actuated by the solenoid 71. To prevent the gate 54 from returning to its original position and to retain illumination of the proper indicating lamp and not re-illuminate the amber lamp L1, a holding or electrical interlock circuit is provided. When a piece of acceptable size is gauged this circuit will maintain the green relay 38 and the solenoid 71 in an energized condition by the closing of contacts 47 and 47b of relay 38, and the consequent maintenance of the positive side of the circuit through the conductor 79 to the relay coil 38. If either switch 72 or 73 is momentarily opened, this holding or interlock circuit will be broken and relay 38 and solenoid 71 will be returned to normal. The holding of this interlock system provides time for the gravity feed, selection and discharge of the work piece to and through the proper compartment which in this case is compartment B. The reason for inclusion of switches 72 and 73 will be explained in detail subsequently.

If now a work piece of greater than standard dimension is inserted to and through the gauging position, the described operations will again take place, but the greater displacement of pivot arm 15 will depress plunger 22 of switch 18, causing the positive circuit of source 33 to be now connected through conductor 51 to red lamp L3 which will be illuminated and solenoid 70, which will be energized. Also relay 39 will be energized, causing green lamp L2 to be extinguished by the opening of contacts 48 and 48a. The holding circuit previously described has again functioned and caused green relay 38 and green solenoid 71 to remain energized. An additional holding circuit for red relay 39 is now present in the form of a positive connection from source 33 on contacts 48 and 48b of relay 39. Thus the red lamp L3 and the relays 38 and 39 as well as solenoids 70 and 71 will all remain energized until either switch 72 or 73 is momentarily opened. The oversized work piece will now be deposited in compartment A by action of gates 53 and 54 as previously described. Again, the holding circuit has provided sufficient time for the gravity feed, classification and discharge into and from the proper compartment.

Since upon passing a work piece through the gauging position, the apparatus will assume an action as described above and hold this position, it is necessary that the neutral or rest position of all mechanisms and circuits be achieved before the next work piece is inserted. To this end the switches 72 and 73 are provided. Switch 73 is so positioned that it will be operated by advancing an article into gauging position. Herein the operating plunger 84 of the switch projects slightly above the surface of the platform upon which the gauged articles are placed at a point in front of the gauging position. Switch 72 of Figures 1 and 5 is a normally closed push button switch mounted on the front panel of housing 52 in order that the operator may manually clear the mechanisms to their normal positions without the insertion of a work piece.

From the preceding description it will be seen that apparatus of the present invention may be used in two different ways depending upon the setting of switch S in the second or third position. When work pieces are not of a suitable dimension or condition to lend themselves to automatic classification, the switch is set in its second position and gauging is done manually by inserting the piece to the gauging position, interpreting the classification from the color of the lamp which is lighted, withdrawing the piece and depositing in one of the three categories, i. e., amber (too small), green (satisfactory) and red (too large). It is to be noted that the lamp indicating mechanisms follow the displacement of the spindle assembly in the same order and, therefore, the work must be maintained in the gauging position a length of time sufficient to interpret the color which represents the size of the gauged work piece.

Many classes of work pieces may be found that lend themselves to automatic classification. Generally such pieces are of simple contour and relatively light weight so that no physical damage will be incurred by dropping them through the opening 5. For such work pieces the switch S is set in third position and inspection time will be greatly shortened since the operator only needs to pass the work piece through gauging position and drop it into the opening 5. All of this can be performed with great rapidity and the capacity of the machine will be only limited by the capacity of the operator.

It is to be noted that while the indicating lamps L1, L2 and L3 also are a part of this circuit and remain in an illuminated condition corresponding to the size of the piece most recently gauged, their function is only to indicate to the operator the general quality of the work being submitted. Thus if too many rejects are noted, the machines producing the work pieces may immediately be adjusted.

As will be readily understood by those skilled in the art, the apparatus of the present invention may if desired be equipped with suitable hopper and feeding mechanism and the size, shape and location of the anvil 4 may be varied, all depending upon the particular size and shape of the work piece to be gauged.

The invention may be variously modified and embodied within the scope of the subjoined claims.

We claim as our invention:

1. In a gauging apparatus having a pivoted switch operating lever arm, the combination of a movable bushing, a gauging pin adjustably mounted in said bushing, a lever contacting pin extending outwardly from said bushing at the end opposite the gauging pin, means providing a stop for said lever contacting pin, adjustable spring means urging said lever contacting pin against said stop, spring means urging said bushing and lever contacting pin toward said lever, and adjustable spring means urging said lever toward said pin.

2. Gauging apparatus including a gauging head comprising an abutment, a gauge pin, yielding means holding the gauge pin in a normal position in which it is spaced from the abutment less than the correct dimension to be gauged, first switch means operated by movement of the gauge pin away from the abutment to a distance substantially equal to the correct dimension to be gauged, and second switch means operated by movement of the gauge pin away from the abutment substantially further than the correct dimension to be gauged; a first indicator for undersize articles, an electric circuit for operating said indicator when the gauge pin is in said normal position and has not operated either of said switch means, a second indicator for articles of correct size, electric contacts that close a circuit for operating the second indicator and open the circuit that operates the first indicator in response to operation of the first switch means, a third indicator for articles of excessive size, other electric contacts that close a circuit for operating the third indicator and open the circuit that operates the second indicator in response to operation of the second switch means, a holding circuit for keeping the electric contacts in position to maintain the second indicator in operation, a holding circuit for keeping the other electric contacts in position to maintain the third indicator in operation, means operated by the next article to be gauged for releasing the holding circuits closed by the gauging of the preceding article.

3. Gauging apparatus including a stationary work table, an abutment supported by said stationary work table, means for holding the abutment in a fixed position with respect to the table, a gauging head connected with the table and including a gauge pin, yielding means holding the gauge pin in a normal position in which it is spaced from the abutment by a distance less than the correct dimension to be gauged, adjustable means for changing the distance between the abutment and the normal position of the gauge pin, first switch means operated by movement of the gauge pin away from the abutment to a distance substantially equal to the correct dimension to be gauged, second switch means operated by movement of the gauge pin away from the abutment substantially further than the correct dimension to be gauged, a first indicator for undersize articles, an electric circuit for operating said indicator when the gauge pin is in normal position and has not operated either of said switch means, a second indicator for articles of correct size, electric contacts that close a circuit for operating the second indicator and open the circuit that operates the first indicator in response to operation of the first switch means, a third indicator for articles of excessive size, other electric contacts that close a circuit for operating the third indicator and open the circuit that operates the second indicator in response to operation of the second switch means, gates for guiding gauged articles into different compartments including a reject compartment for undersize articles, a compartment for articles of correct size, and a compartment for oversize articles, mechanism that positions the gates to guide gauged articles into the reject compartment before said electric contacts have closed the circuits to the second or third indicator, said mechanism including apparatus for positioning the gates to guide gauged articles into the correct-size compartment in response to closing of the circuit that operates the second indicator, and positioning the gates to guide gauged articles into the oversize compartment in response to operation of said other electric contacts to close the circuit that operates the third indicator, control means for maintaining the gates in their operated positions after the gauged article has moved beyond the gauging head, and means for determining how long said control means are effective.

HORACE J. LANDAY.
CHARLES W. WARREN.